United States Patent
Wolff et al.

(10) Patent No.: US 7,562,301 B1
(45) Date of Patent: Jul. 14, 2009

(54) TECHNIQUES FOR GENERATING AND USING PLAYLIST IDENTIFIERS FOR MEDIA OBJECTS

(75) Inventors: Gregory J. Wolff, Redwood City, CA (US); Jamey Graham, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 374 days.

(21) Appl. No.: 11/051,157

(22) Filed: Feb. 4, 2005

(51) Int. Cl.
- *G06F 3/16* (2006.01)
- *G06F 15/177* (2006.01)
- *G06F 3/00* (2006.01)
- *G06F 3/048* (2006.01)
- *G06F 17/30* (2006.01)
- *H04N 7/26* (2006.01)
- *H04L 12/50* (2006.01)

(52) U.S. Cl. .................. 715/727; 715/733; 715/735; 715/736; 715/738; 715/748; 715/783; 715/789; 715/805; 707/10; 707/102; 386/124; 370/383

(58) Field of Classification Search .............. 715/500.1, 715/716, 768, 727, 733, 736, 738, 745, 748, 715/783, 789, 805; 707/10, 102; 386/124; 370/383

See application file for complete search history.

(56) References Cited

U.S. PATENT DOCUMENTS

| | | | |
|---|---|---|---|
| 6,965,770 B2 * | 11/2005 | Walsh et al. ............. 455/426.1 |
| 7,117,250 B1 * | 10/2006 | Wu ............................. 709/217 |
| 7,191,346 B2 * | 3/2007 | Abe et al. .................... 713/194 |
| 2002/0138630 A1 * | 9/2002 | Solomon et al. ............ 709/228 |
| 2003/0028539 A1 * | 2/2003 | Nunome et al. ............... 707/10 |
| 2003/0050058 A1 * | 3/2003 | Walsh et al. ................. 455/426 |
| 2003/0065639 A1 * | 4/2003 | Fiennes et al. .................. 707/1 |
| 2003/0182100 A1 * | 9/2003 | Plastina et al. .................. 704/1 |
| 2003/0182254 A1 * | 9/2003 | Plastina et al. .................. 707/1 |
| 2003/0182315 A1 * | 9/2003 | Plastina et al. ............. 707/200 |
| 2003/0229549 A1 * | 12/2003 | Wolinsky et al. .............. 705/27 |
| 2003/0237043 A1 * | 12/2003 | Novak et al. ............. 715/500.1 |
| 2004/0049395 A1 * | 3/2004 | Gaya ............................... 705/1 |
| 2004/0054627 A1 * | 3/2004 | Rutledge ...................... 705/50 |
| 2004/0078383 A1 * | 4/2004 | Mercer et al. ............... 707/102 |
| 2004/0162787 A1 * | 8/2004 | Madison et al. ............... 705/64 |
| 2006/0008256 A1 * | 1/2006 | Khedouri et al. ............ 386/124 |
| 2006/0146770 A1 * | 7/2006 | Geva et al. .................. 370/338 |
| 2006/0155399 A1 * | 7/2006 | Ward ........................... 700/94 |

\* cited by examiner

*Primary Examiner*—Sy D Luu
*Assistant Examiner*—Linh K Pham
(74) *Attorney, Agent, or Firm*—Townsend and Townsend and Crew LLP

(57) ABSTRACT

Techniques for creating a playlist for media objects are provided. The techniques include receiving a selection of a set of IDs. Each ID is generated based on content of a media objects. A playlist ID is then generated based on the set of IDs and a fixed representation of the playlist ID is created. The fixed representation allows a device to use the playlist ID to determine media objects including the content of media objects used to generate the set of IDs.

19 Claims, 8 Drawing Sheets

AUGUST 2003

| Sunday | Monday | Tuesday | Wednesday | Thursday | Friday | Saturday |
|---|---|---|---|---|---|---|
| 27 | 28 | 29 | 30 | 31 | 1<br>Fresh Air<br>Market Place | 2 |
| 3<br>Car Talk ▼ — 704<br>60 Minutes ▣ — 706 | 4<br>Fresh Air ▼<br>Market Place ▼ | 5<br>Fresh Air ▼<br>Market Place ▼<br>City Arts | 6<br>Fresh Air ▼<br>Market Place ▼<br>West Wing ▣ | 7<br>*Martha's b-day<br>Fresh Air ▼<br>Market Place ▼<br>Pacific Time ▼ | 8<br>10a DA Meeting<br>Fresh Air ▼<br>Market Place ▼ | 9 |
| 10<br>Car Talk ▼<br>60 Minutes ▣ | 11<br>Fresh Air ▼<br>Market Place ▼ | 12<br>Fresh Air ▼<br>Market Place ▼<br>City Arts ▼ | 13<br>Fresh Air ▼<br>Market Place ▼<br>West Wing ▣ | 14<br>Fresh Air ▼<br>Market Place ▼<br>Pacific Time ▼ | 15<br>10a DA Meeting<br>Fresh Air ▼<br>Market Place ▼ | 16<br>Tahoe Video ▣ |
| 17<br>Car Talk ▼<br>60 Minutes ▣ | 18<br>Fresh Air ▼<br>Market Place ▼ | 19<br>*Dave's b-day<br>Fresh Air ▼<br>Market Place ▼<br>City Arts ▼ | 20<br>Fresh Air ▼<br>Market Place ▼<br>West Wing ▣ | 21<br>Fresh Air ▼<br>Market Place ▼<br>Pacific Time ▼ | 22<br>10a DA Meeting<br>Fresh Air ▼<br>Market Place ▼ | 23 |
| 24<br>Car Talk ▼<br>60 Minutes ▣ | 25<br>Fresh Air ▼<br>Market Place ▼ | 26<br>Fresh Air ▼<br>Market Place ▼<br>City Arts ▼ | 27<br>Santa Fe Video<br>Fresh Air ▼<br>Market Place ▼<br>West Wing ▣ | 28<br>Fresh Air ▼<br>Market Place ▼<br>Pacific Time ▼ | 29<br>10a DA Meeting<br>Fresh Air ▼<br>Market Place ▼ | 30 |
| 31<br>Car Talk ◀<br>60 Minutes ▣ | 1<br>Monthly Report | 2 | 3 | 4 | 5<br>*Weekly notes<br>10a DA Meeting | 6 |

FIG. 8

TECHNIQUES FOR GENERATING AND USING PLAYLIST IDENTIFIERS FOR MEDIA OBJECTS

CROSS-REFERENCES TO RELATED APPLICATIONS

This application is related to co-pending U.S. patent application Ser. No. 11/051,072, entitled "TECHNIQUES FOR ACCESSING CONTROLLED MEDIA OBJECTS", filed concurrently herewith, which is hereby incorporated by reference, as if set forth in full in this document, for all purposes.

BACKGROUND OF THE INVENTION

The present invention generally relates to digital media and more specifically to techniques for generating and using playlist identifiers for media objects.

With the rapid growth of computers, an increasing amount of information is being stored in the form of electronic (or digital) documents. These electronic documents include media objects that comprise recorded information. The term "recorded information" is used to refer to information that may comprise information of one or more types. The one or more types may be in some integrated form. For example, recorded information may include one or more of text information, graphics information, animation information, video information, and the like. An example of a media object may be an audio file that includes audio information, such as a digital representation of a song.

As music has become digitalized, portable devices that store media objects, such as songs, have been become very popular. The devices allow local storage of a large number of media objects. The user can then play back the media objects using the devices.

Because of the immense amount of media objects that may be stored on a device, users sometimes desire to organize the media objects. For example, playlists that include a sequence of media objects stored on the device may be created. For example, a hip-hop playlist may be created that includes a number of a user's favorite hip-hop songs that are stored on the device. A second user may see the playlist and may want to use the playlist on their own device. Typically, the second user has to manually create the playlist. However, the second user is limited to creating a playlist using songs stored locally on the second user's device. If all the songs in the playlist are not stored locally, a user would not be able to add that song to the playlist or would have to download the song before adding the song to the playlist.

BRIEF SUMMARY OF THE INVENTION

The present invention generally relates to techniques for generating and using playlist identifiers for media objects.

In one embodiment, a method for creating a playlist for media objects is provided. The method comprises: receiving a selection of a set of IDs, each ID generated based on content of a media objects; generating a playlist ID based on the set of IDs; and creating a fixed representation of the playlist ID, the fixed representation allowing a device to use the playlist ID to determine media objects including the content of media objects used to generate the set of IDs.

In another embodiment, a method for creating a playlist ID is provided. The method comprises: determining a playlist ID; receiving a selection of a set of IDs, each ID generated based on content of a media objects; associating the set of IDs with the playlist ID; and creating a fixed representation of the playlist ID, the fixed representation allowing a device to use the playlist ID to determine media objects including the content of media objects used to generate the set of IDs associated with the playlist ID.

In yet another embodiment, a device for creating a playlist for media objects is provided. The device comprises: logic configured to receive a selection of a set of IDs, each ID generated based on content of a media objects; logic configured to generate a playlist ID based on the set of IDs; and logic configured to create a fixed representation of the playlist ID, the fixed representation allowing a device to use the playlist ID to determine media objects including the content of media objects used to generate the set of IDs.

A further understanding of the nature and the advantages of the inventions disclosed herein may be realized by reference of the remaining portions of the specification and the attached drawings.

BRIEF DESCRIPTION OF THE DRAWINGS

FIG. 8 represents IDs printed on a medium, according to one embodiment of the present invention.

DETAILED DESCRIPTION OF THE INVENTION

Figure 1:
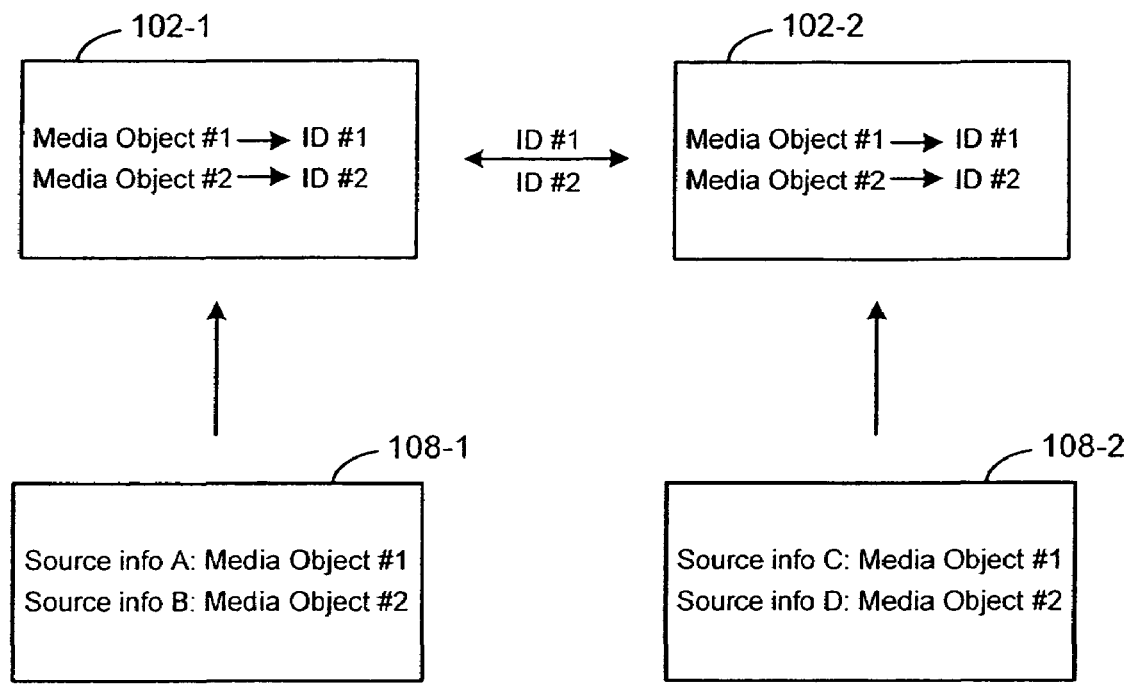
FIG. 1 depicts a system showing the management of media objects according to one embodiment of the present invention.

FIG. 1 depicts a system 10 showing the management of media objects according to one embodiment of the present invention. As shown, a reader 102-1 and reader 102-2 are provided.

Readers 102 are devices configured to access media objects. Media objects may include recorded information. The term "recorded information" is used to refer to information that may comprise information of one or more types. The one or more types may be in some integrated form. For example, recorded information may include one or more of text information, graphics information, animation information, video information, and the like. An example of a media object may be an audio file that includes audio information, such as a digital representation of a song. Readers 102 may be, for example, digital music players (e.g., iPods™, portable jukeboxes), personal digital assistants (PDAs), computers, stereos, tuners, televisions, etc.

Readers 102 are configured to store media objects and/or IDs for the media objects. The IDs may be any identifier that can be used to identify a media object. IDs may be generated such that a media object may be globally identified. For example, an ID may be generated based on the content of the media object. An algorithm, such as a hash or fingerprint, of part of or all of the content of a media object may be used to generate the ID. Additionally, other methods of generating the ID should be appreciated by a person of skill in the art. For example, any method that can globally identify content of a media object may be used.

Content providers 108 provide media objects to readers 102. The media objects may be identified by source information and be encrypted using digital rights. Source information may be information that a content provider 108 uses to identify a media object but may be arbitrary based on various factors (e.g., the source, the title given). For example, the source information may include a source address (URL) that depends on where the song was downloaded, a title of an album, artist, etc. may be different (an artist may be identified as "2Pac" or "Tupac"), etc. Content providers 108 also use a digital rights management system for the media objects provided to readers 102. For example, media objects may be encrypted and require reader 102 to decrypt the media object. The digital rights management may restrict the transferring of media objects from reader to reader. Also, different compression formats may be used. The digital rights management system provides a media object in a format specific to a content provider 108 and the media object can then be decrypted into a particular representation that is universal no matter what digital rights were attached to the media object.

The source information and digital rights are typically bound together and are different among different content providers 108. Thus, the same media object downloaded from different content providers 108 may be identified differently and also be subject to different digital rights. Accordingly, using the source information and the encrypted version of the media object, media objects that have the same content may be considered different.

Accordingly, an ID is generated based on the content of a media object so that the ID may be universally used by a number of readers 102. Accordingly, if the same algorithm is used to generate IDs from the content of media objects, an ID may be used to identify a media object no matter how it was identified by a content provider 108.

Readers 102 may have various media objects locally accessible to them. For example, a first reader 102-1 may download media objects #1 and #2 from a content provider 108-1. The media objects #1 and #2 may be identified by content provider 108-1 by source information as "SOURCE INFORMATION A" and "SOURCE INFORMATION B". For example, first and second URLs may be used to identify media objects #1 and #2. Media objects #1 and #2 may then be stored locally and accessed by first reader 102-1.

A second reader 102-2 may download the same media objects (i.e., the media objects include the same content) from a second content provider 108-2. Although the media objects may include similar content, source information used to identify the content may be different. For example, content provider 108-2 may identify media objects #1 and #2 using the source information "SOURCE INFORMATION C" and "SOURCE INFORMATION D". SOURCE INFORMATION C and SOURCE INFORMATION D may be third and fourth URLs that are different from the first and second URLs.

If source information is used to identify media objects, media objects for the same content may be identified differently. Accordingly, an ID may be used to identify a media object that is stored on another reader 102.

Using an ID that is generated based on the content may be also used for media objects that are sent using different digital rights management system. Media objects not only may be identified differently, but also may be protected using some kind of digital rights management. For example, media object #1 may be encrypted in different formats depending on the content provider 108 used. For example, an encryption key may be needed to decrypt an encrypted media object that is stored on a reader 102. Reader 102-1 may need an encryption key #1 to decrypt media object #1 and reader 102-2 may need an encryption key #2 to decrypt media object #1. The ID is generated using the decrypted media objects. Thus, although different encryption keys are needed, if an ID is generated using the unencrypted content of the media object, readers 102-1 and 102-2 may share the second ID and be able to determine which media object the ID corresponds to. Accordingly, no matter which digital rights management system is used, if the media object is decrypted into the same representation, then an ID generated using the decrypted representation may be used to identify the media object.

Accordingly, readers 102 act as their own registry of media objects available to it. If the same algorithm is used to generate IDs from the content of media objects, IDs exchanged between readers 102 are identical. Additional information may be needed to generate/decode the IDs. For example, the algorithm used to generate the ID, any keys, other identifiers that are needed, etc. may be communicated along with the ID. Thus, readers 102 can share IDs for media object despite the media being identified by different source information and different digital rights.

Figure 2:
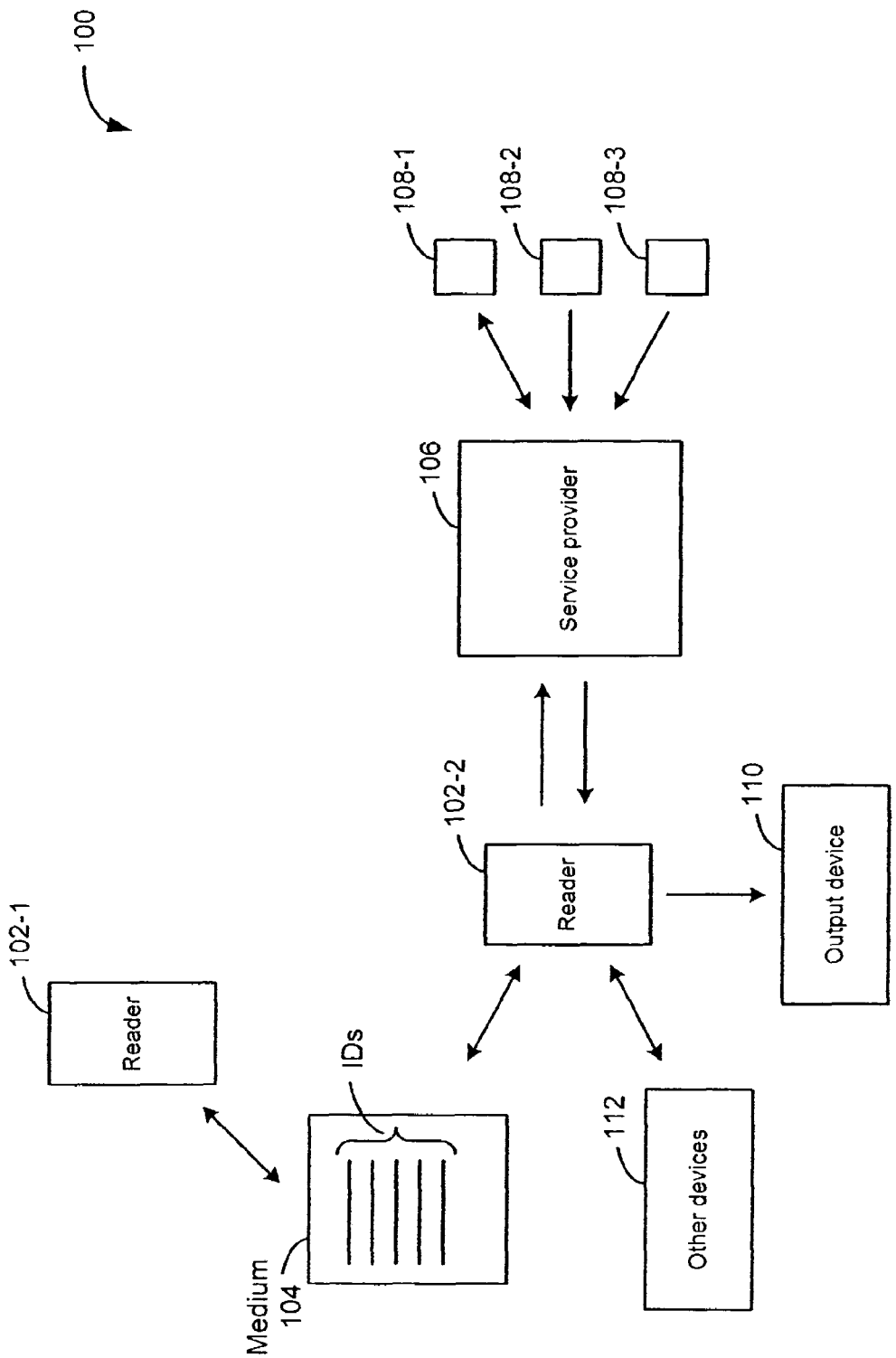
FIG. 2 depicts a system for accessing media objects according to one embodiment of the present invention.

As mentioned above, the IDs may be transferred between readers 102 and used to access media objects. FIG. 2 depicts a system 100 for accessing media objects according to one embodiment of the present invention. System 100 includes readers 102, a medium 104, a service provider 106, one or more content providers 108, and an output device 110.

Readers 102 may be used to output IDs on medium 104 and read IDs on medium 104. For example, a reader 102-1 may output IDs on medium 104 and reader 102-2 may read IDs on medium 104. Readers 102-1 and 102-2 may be different readers or the same reader. Also, although not shown, any number of readers 102 may be provided in system 100.

Medium 104 may be any medium that can visually represent a fixed representation of identifiers (IDs). A fixed representation may be a representation that does not change. An ID may be any information that may identify a media object. For example, medium 104 may be a paper medium with IDs printed on it. The paper medium may be created using any output device, such as a printer, fax machine, copy machine, etc. For example, the IDs may be printed on the paper medium. In another embodiment, medium 104 may be a file configured to store an electronic representation of the IDs. For example, medium 104 may be an electronic document (JPEG, PDF, etc.) that can be used to display the IDs on a display monitor.

Medium 104 may be created by a reader 102-1. For example, media objects may be selected by a user. IDs are generated for the media objects and output on medium 104. Other readers 102 (or reader 102-1) may then use the IDs.

Readers 102 are configured to read IDs from medium 104. For example, reader 102 may include a scanner. The scanner is configured to scan bar codes in the form of IDs. The scanner can then determine an ID from the bar code. In another embodiment, reader 102 may include a radio frequency receiver that may be configured to determine a radio frequency ID (RFID) from medium 102. An ID may then be determined from the RFID.

Readers 102 are also configured to have local access to media objects. For example, a reader 102 may include local storage of media objects. In another embodiment, reader 102 may be configured to access media objects that are stored on a device separate from the reader 102. If the media objects are stored on another local device, it is assumed that reader 102 has rights to the media objects and can access them. For example, the user may have downloaded media objects from a content provider 108 and stored them on a local storage device such as a computer. Accordingly, a user using reader 102 may have access to those media objects. Reader 102 can then communicate with the local storage device and access those media objects because reader 102 has rights to them.

Accordingly, readers 102 may be a system of devices. In one example, reader 102 includes a scanning device, such as a portable digital assistant (PDA) with a bar code reader. In one embodiment, the PDA has local storage in the PDA that stores media objects. In another embodiment, the PDA can communicate with a stereo system or computer that stores media objects. In one embodiment, the media objects are objects that a user has rights to and can access them.

As mentioned above, the IDs may be generated based on the content of the media object. Readers 102 may receive media objects from many different sources. For example, reader 102 may download media objects from music services such as iTunes™, RealPlayer™, Wal-Mart, etc. As mentioned above, media objects may have different source information and digital rights but include the same content. Thus, a first reader 102-1 may have a first media object that was received from content provider 108-1 and a second reader 102-2 may have a second media object that was received from content provider 108-2. It is desired that, even though these media objects may be identified differently when received from content providers 108-1 and 108-2, a global identifier for the media object may be determined that may be substantially similar if media objects include substantially similar content. Accordingly, an ID may not depend solely on source information (e.g., the source, title, etc.).

Generating an ID based on the content of a media object enables different readers 102 to read an ID and determine which media object the ID is corresponds to. Accordingly, if an ID corresponds to an ID for a media object locally accessible to a reader 102, then it can be determined that reader 102 has local access to that media object. This may be the case even if reader 102 had received the media object from a different source than a media object used to create the ID, the media object is identified differently, or the media object was subject to different digital rights.

Thus, a universal system of identifying media objects using IDs is provided. This may be very useful. For example, a first reader may generate an ID. The ID is generated based on the content of the first media object. Thus, if a second reader 102-2 reads the ID, it can compare the ID to other IDs for media objects locally accessible to the second reader 102-2 to determine if a second media object with the same content is locally accessible. Thus, even if a second media object that has been downloaded is identified with different source information (e.g., received from a different source), an ID for the first media object generated based on the first media object's content, when compared, may match if they have similar content. Thus, it can be determined by reader 102-2 that a second media object corresponding to the ID is locally accessible to reader 102-2.

If reader 102-2 does not have local access to a media object, reader 102-2 may request the media object from another source. For example, reader 102-1 may request the media object from other devices 112 or a service provider 106. Other devices 112 may be other readers 102, storage devices, computers, stereos, etc. Reader 102-1 may communicate through any methods, such as using Bluetooth, infrared, or any other wireless or wire line protocol.

Reader 102-2 may also be configured to communicate with service provider 106. Service provider 106 may be any entity configured to provide media objects. Although service provider 106 and content providers 108 are shown as separate entities, it will be understood that the functions described for both may be performed by any number of entities.

In one example, reader 102-2 may send requests for media objects to service provider 106 through a communication network, such as the Internet, a wireless network, a wireline network, etc. Service provider 106 may then facilitate the communication of media objects to reader 102-2.

Service provider 106 may also be configured to provide secure access to the media objects. For example, as will be described in more detail below, a request from reader 102-2 may be encrypted using encryption methods and the media objects sent back to reader 102-2 in response to a request may be encrypted using encryption methods. Encryption methods may be configured such that reader 102-2 may be the only reader 102-2 that can decrypt and use the encrypted media object. Thus, digital rights management for the media object is provided.

Content providers 108 may be configured to receive requests from service provider 106 and provide media objects in response to the request. For example, content providers 108 may be services that manage media objects, such as Apple's iTunes™, RealPlayer, Wal-Mart, etc. Access to the media objects (such as digital rights) may be provided by content providers 108. The access may be provided by content providers 108 for a fee. For example, downloads of songs may be provided for 99 cents. Service provider 106 may manage a user's account and provide payment on the fee in behalf of the user.

Reader 102-2 is configured to output media objects whether they are already locally accessible or downloaded from service provider 106. For example, reader 102-2 may send media objects to output device 110. Although output device 110 is shown separately from reader 102, it will be understood that output device 110 may be part of reader 102-2.

In one embodiment, output device 110 is a speaker configured to audibly output a media object. Also, output device 110 may be a system configured to output a media object, such as a desktop stereo system, a receiver and speakers, a computer, etc. Also, output device 110 may be configured to visually display a media object (e.g., a video) for example, output device 110 may be a computer, television, display monitor, etc. A person of skill in the art will appreciate other output devices 110.

Figure 3:
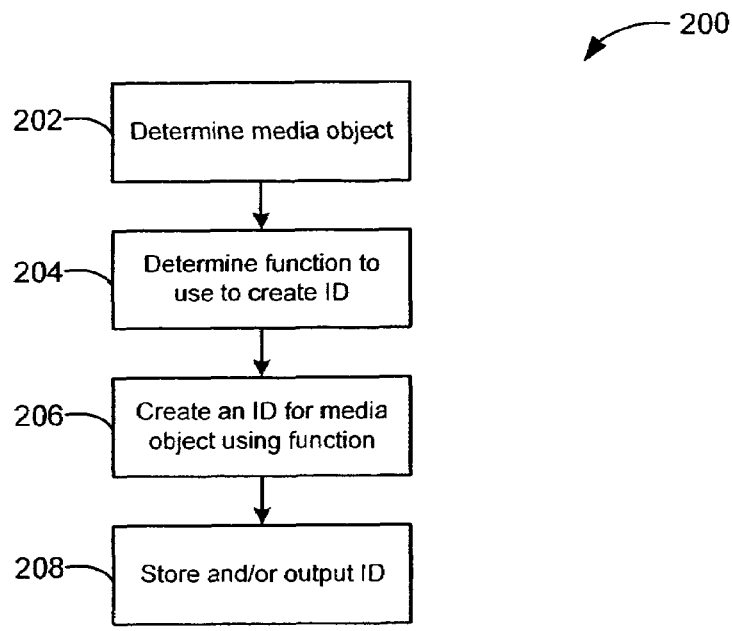
FIG. 3 depicts a simplified flowchart of a method for creating an ID according to one embodiment of the present invention.

FIG. 3 depicts a simplified flowchart 200 of a method for creating an ID according to one embodiment of the present invention. IDs may be created for use when a reader 102 is reading IDs from medium 104 or for use when a reader 102 is outputting IDs on medium 104. It will be understood that IDs may be created on demand when an ID is required or may be generated beforehand and stored. For example, a table of IDs for media objects locally accessible to a reader 102 may be generated and stored.

In step 202, a media object is determined. For example, a reader 102 may include one or more media objects that are locally accessible. An ID may be created for all of the locally accessible media objects. Additionally, the IDs may be created on demand, such as when an ID is captured from medium 104.

In step 204, an algorithm to use in creating the ID is determined. For example, a hash function or fingerprint function may be used to create an ID. Also, the function used may be specified by an application. For example, if an ID is received, information in the ID may specify which algorithm was used to create the ID. Accordingly, the same algorithm can be used to create the ID.

In step 206, an ID is created for the media object using the algorithm determined in step 204. In one embodiment, the content of the media object is used to create the ID. For example, a hash of a part of or all of the content of the media object is generated and used as at least part of the ID. Accordingly, media objects stored in different devices that include the same content may be globally identified. Media objects may be received from different sources and include different source information and be encrypted using different digital rights. However, if an ID is created based on the content of the media objects, which may be substantially similar, then this ID may be used to globally identify the media object. It should be understood that the ID may contain information other than the content used to generate the ID. For example, information for a content provider 108 where a media object can be downloaded from may be provided.

In step 208, the ID may be stored and/or outputted. For example, a reader 102 may store created IDs in a table for later use. Thus, when an ID is read from a medium 104, the ID may be compared to IDs in the table of IDs. In another embodiment, the ID may be outputted on a medium 104. For example, the ID may be printed on a paper medium 104.

In one embodiment, the above process may be performed when an ID is read from medium 104. In this case, IDs are generated for media objects locally accessible to reader 102. The IDs may then be compared with an ID read from medium 104.

Figure 4:
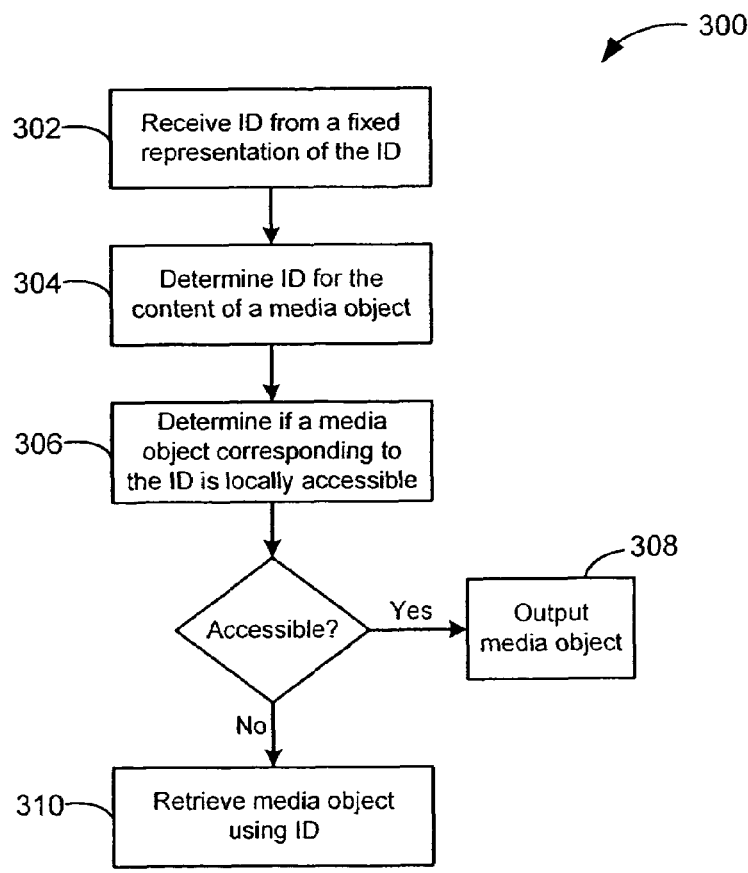
FIG. 4 depicts a simplified flowchart of a method for accessing a media object using an ID according to one embodiment of the present invention.

FIG. 4 depicts a simplified flowchart 300 of a method for accessing a media object using an ID according to one embodiment of the present invention. In one embodiment, IDs may be printed on medium 104. The IDs may then be captured by the reader 102. For example, the ID may be scanned by reader 102.

In step 302, an ID is received from a fixed representation of the ID on medium 104. As mentioned above, an ID may be printed on medium 104 and captured by reader 102. For example, a bar code may be scanned by a bar code reader.

In step 304, an ID for the content of a media object associated with the ID determined in step 302 is determined. The ID received in step 302 may include additional information other than an ID generated from the content of the media object. For example, additional information may have been included in the ID, such as which algorithm was used to generate the ID, a URL that indicates a source of a medium object, or other information needed to determine how the ID was generated. This information may be separated from an ID that is generated using the content of a media object associated with the ID.

In step 306, it is determined if a media object corresponding to the ID is locally accessible. For example, the ID determined in step 304 may be compared to a list of IDs generated for one or more media objects locally accessible to reader 102. It is determined if the ID corresponds to an ID for a media object in the one or more media objects. For example, the IDs may match or be substantially similar. If content of a media object is used to generate an ID, it is expected that IDs for two media objects may be the same. It will be understood that content for two media objects may be slightly different. However, techniques may be provided such that the slight differences yield an ID that is substantially similar.

By comparing IDs based on the content of media objects, it can be determined if a first media object used to generate the ID in step 302 corresponds to a second media object that is locally accessible to reader 102. This may be true even if the first and second media objects were received from different content providers 108, include different identification information or were encrypted using different digital rights.

In step 308, if a media object corresponding to the ID is locally accessible, then the media object is retrieved and outputted. For example, a media object may be sent to an output device 110 for playing. Additionally, other actions may be performed, such as copying and storing media objects in a different file, etc.

In step 310, if a media object corresponding to the ID is not locally accessible, then the media object may be retrieved using the ID. For example, any other devices 112 may be checked to see if the media is stored and accessible on them. The media object may then be retrieved from other devices 112. In one embodiment, an encrypted media object may be sent to reader 102. Reader 102 may then use a decryption key to decrypt the encrypted media object. The decrypted media object may then be outputted. An example of this is an encrypted digital media object is received at reader 102 and a decrypted analog media object is outputted. Accordingly, reader 102 does not need to locally store the media objects, the ID can be used to retrieve the media object. The ID and the key is used to gain access to encrypted media objects.

In another example, service provider 106 may be contacted with a request to retrieve the media object. The ID received in step 302 may specify a content provider 108 and the ID may be used to request the media object from the content provider 108. Service provider 106 may then contact the content provider 108 that may provide the media object to service provider 106 with a request for the media object corresponding to the ID. Content provider 108 may then send the media object to service provider 106, which then sends it reader 102. This process will be described in more detail below.

Accordingly, a process for accessing media objects is provided. An ID is provided on a medium 104 where the medium 104 may be used by multiple readers 102 other than a reader 102 that generated the ID on medium 104. Because of digital rights management restrictions, the media object associated with the ID may not be transferred between readers 102. However, the use of IDs enables the identification of a media object from reader to reader even if readers 102 cannot transfer media objects between each other. Also, because media objects can be downloaded from various content providers 108, media objects may be received from different sources. Different source information may identify the media objects differently. Accordingly, a global ID is used to identify media objects to determine if the media object is locally accessible (e.g., already been downloaded from a content provider 108). Also, if a media object is not locally accessible, then the ID may be used by reader 102 to request the media object.

Figure 5:
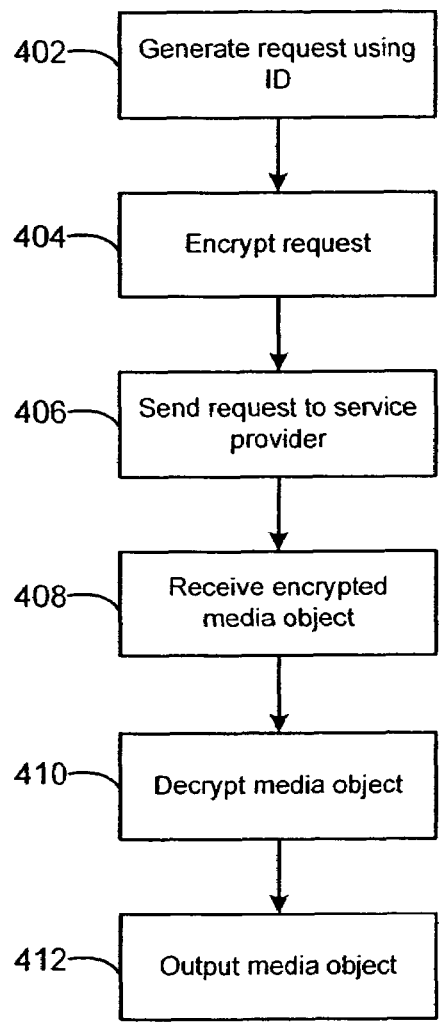
FIG. 5 depicts a simplified flowchart of a method for requesting a media object according to one embodiment of the present invention.

FIG. 5 depicts a simplified flowchart 400 of a method for requesting a media object according to one embodiment of the present invention. In one embodiment, a secure request and communication of a media object may be provided by embodiments of the present invention. Although the following description describes an encryption scheme using public keys and private keys, it will be understood that persons skilled in the art will recognize other encryption methods that may be used.

In step 402, a request for a media object is generated using an ID read from medium 104. The ID may include a source address for a content provider 108. This may indicate which content provider 108 the media object may be downloaded from. In other embodiments, a source address may not be provided. Rather, service provider 106 may determine which content provider 108 to download the media object from. Because the ID may uniquely identify the content of a media object, service provider 106 may identify which media object is being requested using the ID. Service provider 106 may then determine which content provider 108 can provide the media object.

In step 404, the request generated in step 402 is encrypted using information associated with the reader 102 sending the request. For example, the request may be encrypted using a public key associated with reader 102. A person of skill in the art will appreciate methods used to encrypt the request using the public key.

In step 406, the request is sent to service provider 106. The request may be sent through any communication method, such as through the Internet, a wireless network, wireline network, local area network (LAN), wire area network (WAN), etc. Although service provider 106 is described as the intermediary between reader 102 and content providers 108, it should be understood that a request may be sent to content providers 108 without going through service provider 106. If a source address is found in the ID, then requests may be sent directly to content providers 108. If no source address is found in the ID, service provider 106 may determine a content provider 108 in order to send a request.

Service provider 106 decrypts the request. For example, service provider 106 may include a registry of public keys. A public key for the reader 102 that sent the request may be looked up in the registry and used to decrypt the request. A person skilled in the art will appreciate other methods of decrypting the request.

Service provider 106 can then request the media object from a content provider 108. In one embodiment, service provider 106 may provide billing services for reader 102. For example, downloading a media object may cost a fee. For example, downloads of individual songs may cost 99 cents. Accordingly, service provider 106 may manage a user's account with a content provider 108 in order to download a media object. For example, service provider 106 may send a payment to content provider 108 and then credit a user's account for the payment. The user may then be billed by service provider 106.

Service provider 106 may then encrypt the media object using a public key associated with reader 102. Service provider 106 may then send the encrypted media object to reader 102.

In step 408, the encrypted media object is received at reader 102. The encrypted media object may be sent using any communication methods and be sent through the Internet, a wireless network, wire line network, etc.

In step 410, reader 102 may decrypt the media object. For example, the media object may have been encrypted using a public key of reader 102 by service provider 106. Reader 102 may use a private key installed in reader 102 to decrypt the encrypted media object. Accordingly, because reader 102 may be the only device that includes the private key corresponding to the public key used to encrypt the media object, communication of the media object may be considered secure because that reader 102 can only decrypt the media object. Accordingly, if the encrypted media object is intercepted by another device, that device should not include a private key of the reader 102.

Additionally, if the media object is communicated to a second reader 102, the media object may be configured such that the encrypted version is sent. Thus, the second reader 102 may not have the private key and thus cannot decrypt the media object. Accordingly, a form of digital rights management is provided.

In step 412, after the media object is decrypted, reader 102 may output the media object. For example, reader 102 may send a media object to an output device 110, which may then play the media object. For example, the output device may play a song. For example, analog audio jacks may connect a reader 102 to output device 110. Also, the media object may be stored locally.

APPLICATIONS USING EMBODIMENTS OF THE PRESENT INVENTION

Digital Rights Management

Digital rights management may be provided using embodiments of the present invention. A decryption key may be generated using the content of the media object itself. For example, an ID may be generated based on the content of the media object along with a decryption key based on the content of the media object. In this case, two readers 102 may communicate securely without the need for a separate key exchange. The communication of a media object encrypted with the generated decryption key between devices may be considered secure because a device that previously accessed the media object may have been able to generate the decryption key.

For example, a content provider 108 can send a media object #1 encrypted with a key A to a reader 102-1. The media object #1 may be decrypted using a key H. The decrypted version of the media object may be used to generate an ID #1 and a key B based on the unencrypted content of the media object. Content provider 108 may also send media object #1 encrypted with key A to reader 102-2. Reader 102-2 may decrypt media object #1 and generate ID #1 and key B based on the unencrypted content of the media object.

Now, readers 102-1 and 102-2 may use the IDs to communicate. For example, reader 102-1 may not have a large amount of storage and may just store key B and ID #1. Reader 102-2, however, may have larger storage capacity and may store the media object along with keys B and ID #1. Reader 102-1 can now retrieve media object #1 (encrypted with key B) using ID #1. This retrieval may be made without readers 102-1 and 102-2 needing to trust each other. This is because the unencrypted media object (decrypted by H) would have been needed to generate ID #1 and key B. Thus, it can be assumed that reader 102-1 received the encrypted media object, decrypted it using key H, and then generated the ID # and key B. Because media object #1 is encrypted with key B, reader 102-1 still needs key B to decrypt the media object #1. Thus, the ID #1 is not sufficient to decrypt the media object #1 and content provider 108 can trust that only readers 102 that received (and paid for) the media object #1 are able to decrypt and play the media object.

Other information may be exchanged using the above scheme may be appreciated. For example, reader 102-2 may receive the encrypted version and ID #1 from content provider 108. Reader 102-2 may use reader 102-1 (which has key H) in order to decrypt the media object. The ID #1 and key B may also be used to exchange any other information that is needed.

An encryption key can also be generated from the content of a media object and used to exchange information in other scenarios. For example, a first ID may be created using the content of a media object #1. The first ID may be 256 bits. The first 128 bits may be a second ID to identify the media object and the second 128 bits may be an encryption key. Reader 102-1 may store the encryption key and second ID for the media object but may not store the media object. If reader 102-1 desired to access the media object, a different reader 102-2 that is storing the media object may be used to access the media object. Reader 102-2 may generate the second ID and encryption key, and encrypt the media object using the encryption key. The encrypted media object and the second ID may then be sent to reader 102-1. Using the second ID to retrieve the appropriate encryption key, the encrypted media object may be decrypted using the encryption key stored by reader 102-1. Accordingly, if reader 102-1 did not already have access to the content, then reader 102-1 would not be able to decrypt the encrypted media object because the encryption key is generated using the content of the media object. Thus, media objects may be securely sent without having to exchange encryption keys.

The partial content of a media object may also be used to generate an ID. In this case, an offset indicating which area of the media object that was used to generate the ID may be sent along with the ID. For example, reader 102-1 may store a song. A first ID may be generated using the entire content of the song. Reader 102-2 may generate a second ID for a portion of the song, for example, seconds 30-60 of the song. Reader 102-2 sends the first ID and the second ID and information indicating the offset from the first ID to reader 102-1. Reader 102-1 may not have registered the second ID because it is a portion of the song but can use the first ID to determine the media object and then generate the second ID from the portion of the media object. In this way, portions of media objects may be communicated. This may be useful where important parts of meetings or phone conversations may be blocked out of a media object and the IDs are sent for those portions.

In another example, a reader 102 may include a number of IDs. In one example, reader 102 may be sold with just the IDs without any media objects. Also, reader 102 may include one or more decryption keys. In this example, reader 102 may use the IDs to retrieve media objects. Encrypted media objects may be sent in response to receiving an ID. The decryption keys are then used to decrypt the encrypted media objects. In one embodiment, possession of the IDs and corresponding decryption keys enables a reader 102 to access media objects. In order to access a media object, the ID is used to request the media object and then a decryption key is used to decrypt an encrypted media object. In this way, both the ID and decryption key are necessary to unlock a media object.

Playlists

The creation of playlists is a useful function that may be provided by readers 102. For example, many different media objects may be locally accessible to a reader 102. For example, many different albums for artists may be stored on a reader 102. The user may only wish to listen to certain songs in a certain order. Instead of manually skipping around between albums to play the songs, playlists may be created that play a sequence of songs selected by a user.

The playlist is created using information locally accessible to reader 102. For example, the playlist may be useful for referencing songs that are stored in reader 102. A playlist references locally accessible songs and in order for the playlist to work on another reader 102, the playlist and songs may have to be transferred together. If songs cannot be transferred between readers 102, then the playlist of songs cannot be transferred. This helps content provider 108 maintain ownership of the media objects and ensures that media objects may only be played by particular readers 102. For example, a reader 102 that downloads a song from a content provider 108 may not be able to transfer that song to another reader 102. Accordingly, the transfer of media objects for the playlist may not be enabled for reader 102. However, a second user may like the playlist created by a first user want to have the playlist on his/her reader 102. The second user may have to create the playlist manually on their own reader 102 but may not have all the songs in the playlist locally accessible. Thus, the exact playlist may not be automatically created.

Figure 6:
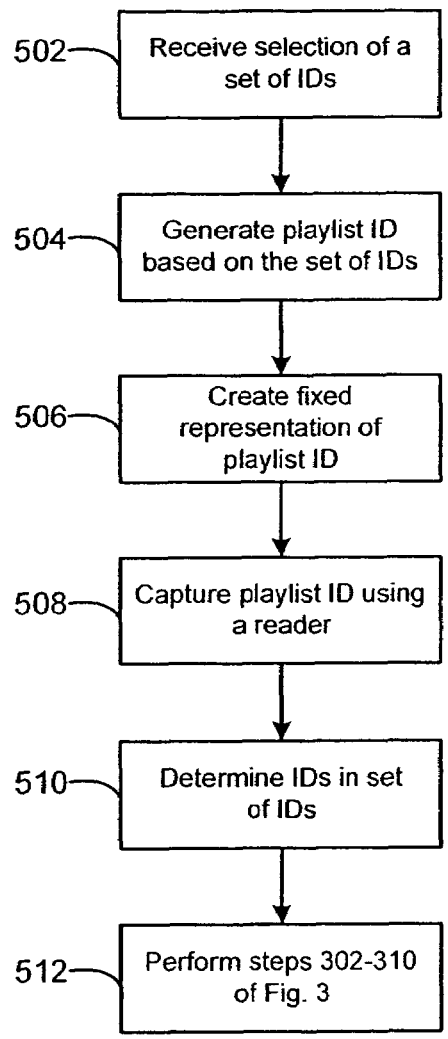
FIG. 6 depicts a simplified flowchart of a method for creating and using a playlist according to one embodiment of the present invention.

FIG. 6 depicts a simplified flowchart 500 of a method for creating and using a playlist according to one embodiment of the present invention. In step 502, a user may select a set of IDs. For example, a set of IDs may have been printed on medium 104. The user may use reader 102 to scan the set of IDs in a certain order. Any number of IDs may be captured and in any order. For example, a list of albums includes IDs for all the songs on the albums. A user may capture IDs for songs in different albums in a sequence. That sequence of IDs is received as a set of IDs.

In step 504, a playlist ID is generated based on a set of IDs. The playlist ID may be generated in many ways. For example, a playlist ID may point to a table that includes the set of IDs. Also, the set of IDs may be encoded in the playlist ID. Thus, a reader 102 that captures the playlist ID may be able to decode the set of IDs from the playlist ID.

In step 506, a fixed representation of the playlist ID is created. For example, a playlist ID may be printed on a medium 104, displayed on a monitor, etc.

In step 508, the playlist ID is captured using a reader 102. A reader 102 may be a different reader than a reader 102 that created the playlist ID or the same reader 102.

In step 510, reader 102 determines the IDs in the set of IDs based on the playlist ID. For example, a playlist ID may be decoded into a set of IDs. Also, in another embodiment, a pointer decoded from the playlist ID may be used to determine a table that lists the set of IDs.

In step 512, steps 302-310 in FIG. 3 may be performed for IDs in the set of IDs. For example, reader 102 determines if media objects that correspond to the IDs are locally accessible or need to be requested from a content provider 108.

In another embodiment, a playlist ID may be generated and IDs for media objects may be associated with the playlist ID. The IDs may be added to the same playlist ID at any time.

The playlist ID may be generated by reader 102. For example, reader 102 may arbitrarily generate a number for the ID. In another embodiment, reader 102 may contact a server that generates the playlist ID. The playlist ID may be generated such that playlist IDs are different. For example, a counter may increment the playlist ID every time one is requested.

A user may then select a set of IDs using reader 102. Other methods of selecting an ID may also be appreciated. The IDs are generated based on the content of media objects.

The set of IDs are then associated with the playlist ID. For example, the playlist ID may point to a table that the set of IDs are stored in. When the IDs are selected, they may be stored in the table. In one embodiment, the table is an XML table that stores the IDs.

A fixed representation of the playlist ID is created. The fixed representation may be printed on a medium 104, displayed on a monitor, etc. It should be noted that the fixed representation can be created before or after the set of IDs are associated with the playlist ID.

A user can also dynamically associate IDs with the playlist ID. For example, at a later time, a user can select one or more additional IDs. These IDs are then associated with the playlist ID. For example, the one or more additional IDs are added to the table that the playlist ID points to. The one or more additional IDs are now part of the playlist that can be accessed using the playlist ID.

The playlist ID may be used to access media objects as described in steps 508-512 of FIG. 6.

By using a playlist ID that stays the same even though additional IDs are associated with the playlist ID, a new playlist ID does not need to be created when new media objects are added to the playlist. Accordingly, the playlist is dynamic. A user thus does not need to re-generate playlist IDs every time the playlist is changed.

Accordingly, a playlist generated by a first reader 102 may be used by a second reader 102. Although a content provider 108 may maintain ownership of the actual content of the media object (i.e., it may not be transferred from a first reader 102 to second reader 102), IDs may be used to generate a playlist in other readers 102. Accordingly, the playlist generated by a user may be automatically used by other users. Also, using the IDs, a reader 102 can determine whether the media objects associated with the playlist are accessibly locally. Thus, a reader 102 may automatically output those media objects. Additionally, because the IDs identify a media object using its content, a reader 102 can determine if a media object is locally accessible regardless of where it was received from.

EXAMPLES USING EMBODIMENTS OF THE PRESENT INVENTION

Embodiments of the present invention will now be described using an example. A user, Bob, owns a reader 102 referred to as a Ricoh Audio Player (RAP). The RAP is able to use a paper interface to arrange and organize Bob's collection of MP3 audio files. The RAP player is configured as a device that can interface with an audio system and home audio network. For example, the RAP player may include a wireless interface for controlling the audio system.

Bob may perform many functions using the RAP player. For example, Bob can create a paper catalogue with the contents of his audio file collection. The paper catalogue can be placed in a binder in, for example, alphabetical order and band and album contents can be printed with the original artwork associated with the compact disc. An ID can be printed for each available song in the audio file collection.

The audio file collection can also be printed onto labels. For example, each label can contain an ID representing an album's contents. The labels can then be physically placed onto the actual CD case or in a container containing the actual CD. This provides access to the CD's contents while browsing the CD collection.

Labels can also be printed individually to represent the contents of a new CD, newly downloaded music, or dynamic content, such as a playlist. For example, Bob can create playlists by selecting song titles from the paper audio file catalogue. When the playlist is complete, a new label with a playlist ID can be printed. Bob can write on this label to identify a title for the playlist and then adhere it to any location. For example, Bob may stick the label onto a magnet and place it on his refrigerator where it is easily accessible by any users. If Bob continued this process with both playlists and song lists for his music collection, Bob could create clusters of music on his fridge based on the content type, preference, or mood. The end result represents a sort of map of music with personalized clusters of music. Also, because the IDs are on paper, they can be dynamically rearranged at any time. The spatial nature of this sort of representation provides Bob with an easy way to locate his music when he is ready to play songs.

Figure 7:
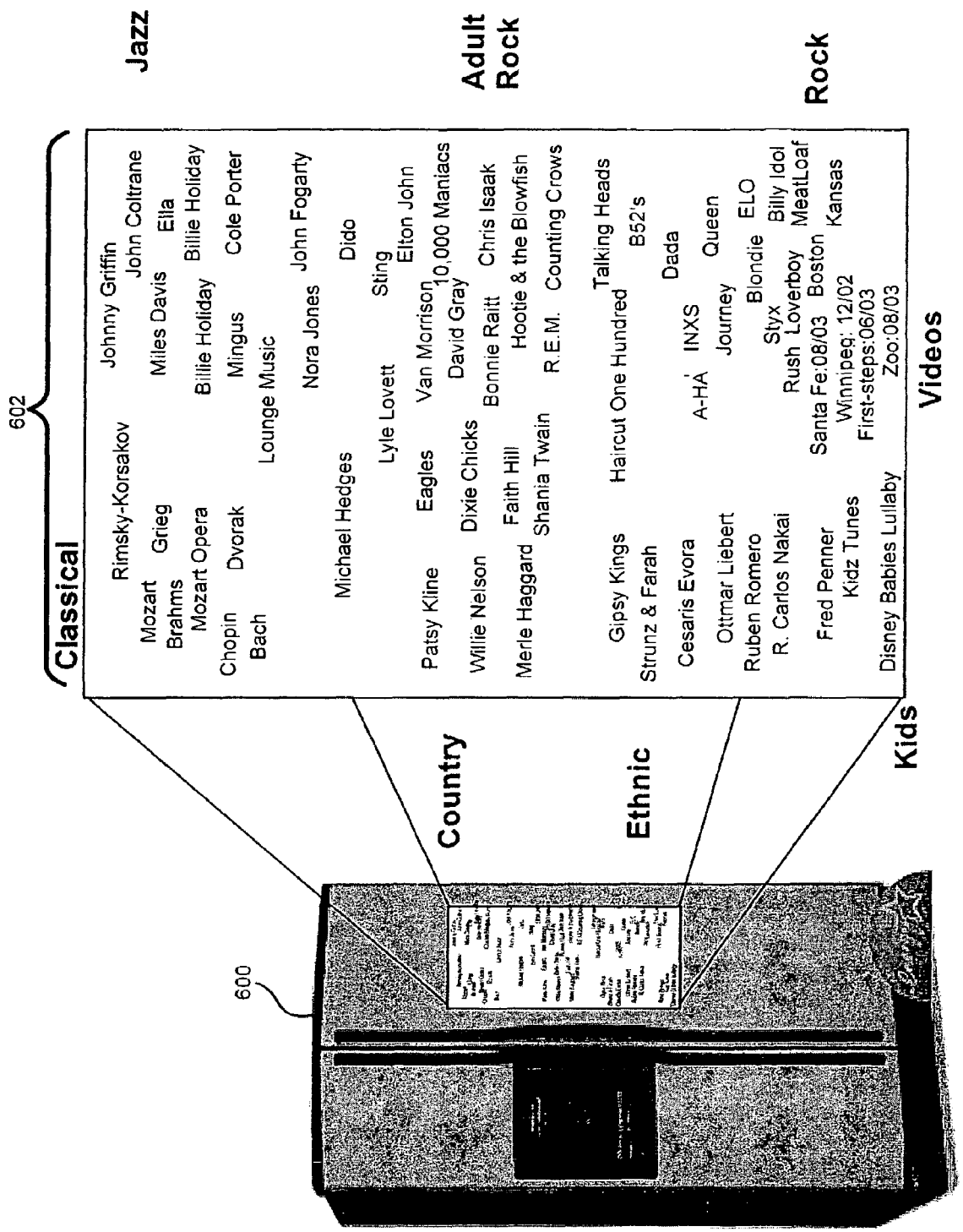
FIG. 7 depicts an example of labels organized on a device.

FIG. 7 depicts an example of labels organized on a device 600. As shown, labels may be arranged on a portion 602 of device 600. As shown, different categories of music may be arranged in portion 602. As shown in portion 602, a name is shown, which may be an ID. Also, IDs associated with the names (not shown) may be provided under or near the names. In organizing the IDs 112, Bob may use some artists to bridge the gap between different categories of music. For example, the artist "Lyle Lovett" falls into several categories and thus Bob naturally places his "Lyle Lovett" IDs in-between the categories jazz, country, and rock. These labels can also be placed in different parts of Bob's home. For example, Bob can also place IDs on his Christmas tree ornaments that correspond to his Christmas music.

FIG. 8 represents IDs printed on a medium 702 according to one embodiment of the present invention. In one example, Bob may have several favorite radio programs that are on during the day while he is at work. For example, his RAP player may automatically record Fresh Air, Market Place, City Arts and Lectures, and Car Talk. At the beginning of each month, Bob may print out a new calendar that is put up in a location, such as a kitchen. Calendar 702 may show the preferred radio shows on the days they occur throughout the month and an audio icon 704. At the beginning of the month, these IDs have no meaning because the program has not been recorded yet. However, as the month progresses, the shows for the past days become available. When Bob gets home from work, he can choose to listen to the recorded radio program by selecting the ID on the calendar. The programs recorded for the ID may be video or audio and may be denoted by an audio icon 704 and a video icon 706.

For the case of a video icon 706, a digital video recorder, such as a TiVo system, records television programs. Selecting the ID for a television program in the calendar using the RAP player may start video playback of the television show on a T.V. Bob may also have several home videos available in the calendar that correspond with the dates that a trip was taken. For example, if Bob was in Santa Fe at the beginning of the month, he can refer to that calendar date and select an ID for the Santa Fe trip. A home video may then be outputted.

In another example using the RAP player, a user can use the paper medium for transporting content that the user owns to another location. For example, Bob may be invited to his friend Janet's party. Janet may have asked Bob to bring music for the party. Using the RAP player described above, Bob may create several playlists to be played throughout the duration of the party. Bob can then print the collection of playlists onto sheets of stickers and the stickers can be placed on a bulletin board near the stereo at the party. These stickers may include playlist IDs for the songs that are included in the playlist. The audio content may then be stored locally in Bob's RAP device.

When Bob arrives at the party, he can place these stickers with the playlist IDs near the stereo and several copies in the kitchen or in the patio such that he can change the music from several locations. When Bob captures a first playlist ID, the RAP device may be configured to communicate with Janet's output system. This connection may be made by physically plugging cables into the RAP device or through wireless communication such as a wireless network. The ID may be used then to determine the media object associated with the Second ID and that media object is sent to an output device.

This example uses the RAP device that has digital rights and access to an interface for allowing the audio files to be accessed and played in other environments. This is possible because Bob's RAP device is present at the party and provides an access key for Janet's output system (i.e., the public key required to access the MP3). For example, the public key may be used to decrypt the audio file which may then be streamed to the output device. In another example, the public key may be sent with the streaming media to the output device. The output device may then use the public key to decrypt and output the media object.

Another user, such as Janet, or anyone else, may also use their own RAP players to play media objects from Bob's playlist ID. However, if the other users do not already own rights to play the particular media objects (i.e., the media objects were not locally stored on their own RAP devices), then they would be required to download the media objects from a service to their device before playing the device.

In another example, a user, such as Bob, may be interested in adding more media objects to his collection. While at a grocery store, Bob may pick up the latest edition of Rolling Stone magazine. The magazine provides the latest reviews as well as a list of the top 50 albums in the country. An ID may be associated with each album that allows Bob to do two things: preview the album's contents and purchase the album if desirable. Using the RAP device, Bob can select an ID for an album and listen to short clips of each song in the album. If Bob decides that he wants to purchase this album for his own collection, Bob may capture the ID again and confirm an intent to purchase the album. This may generate a request to a service assigned to Bob's public key. A service provider 106, after checking Bob's account and possibly withdrawing payment, retrieves the contents of the album and Bob's RAP system downloads the contents encrypted with Bob's key. The contents may be downloaded to the RAP device that scanned the ID or to another device, such as Bob's computer. Optionally, a label is automatically printed out to represent the new album.

Additionally, Bob can also be provided with a list of songs, such as a new music list from an iTunes™ account. Bob may select individual songs and have them added to his collection as described above.

Figure 9:
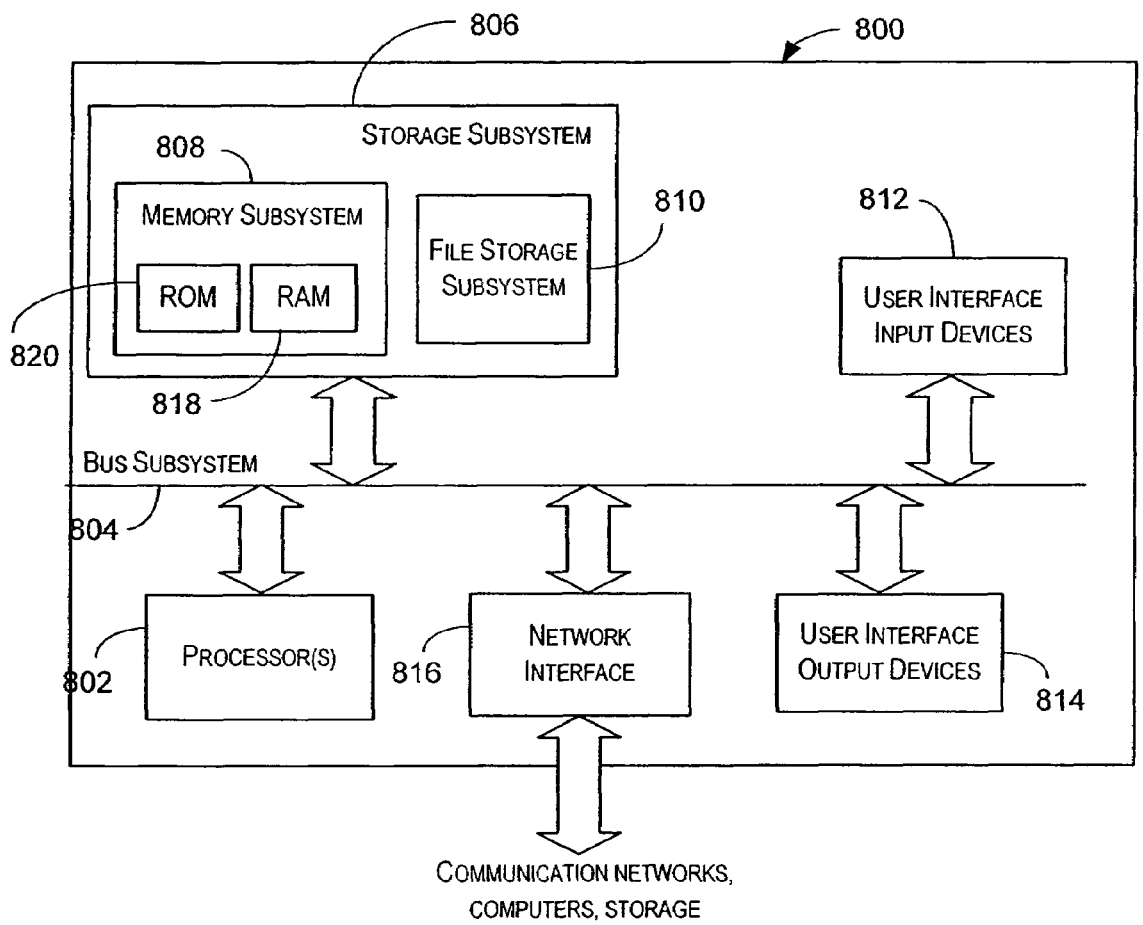
FIG. 9 is a simplified block diagram of data processing system that may be used to perform processing according to an embodiment of the present invention.

FIG. 9 is a simplified block diagram of data processing system 800 that may be used to perform processing according to an embodiment of the present invention. As shown in FIG. 9, data processing system 800 includes at least one processor 802, which communicates with a number of peripheral devices via a bus subsystem 804. These peripheral devices may include a storage subsystem 806, comprising a memory subsystem 808 and a file storage subsystem 810, user interface input devices 812, user interface output devices 814, and a network interface subsystem 816. The input and output devices allow user interaction with data processing system 802.

Network interface subsystem 816 provides an interface to other computer systems, networks, and storage resources. The networks may include the Internet, a local area network (LAN), a wide area network (WAN), a wireless network, an intranet, a private network, a public network, a switched network, or any other suitable communication network. Network interface subsystem 816 serves as an interface for receiving data from other sources and for transmitting data to other sources from data processing system 800. For example, data processing system 800 may access media objects via network interface subsystem 816. Embodiments of network interface subsystem 816 include an Ethernet card, a modem (telephone, satellite, cable, ISDN, etc.), (asynchronous) digital subscriber line (DSL) units, and the like.

User interface input devices 812 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information to data processing system 800.

User interface output devices 814 may include a display subsystem, a printer, a fax machine, or non-visual displays such as audio output devices. The display subsystem may be a cathode ray tube (CRT), a flat-panel device such as a liquid crystal display (LCD), or a projection device. In general, use of the term "output device" is intended to include all possible types of devices and ways to output information from data processing system 800.

Storage subsystem 806 may be configured to store the basic programming and data constructs that provide the functionality of the present invention. For example, according to an embodiment of the present invention, software modules implementing the functionality of the present invention may be stored in storage subsystem 806. These software modules may be executed by processor(s) 802. Storage subsystem 806 may also provide a repository for storing data used in accordance with the present invention. Storage subsystem 806 may comprise memory subsystem 808 and file/disk storage subsystem 810.

Memory subsystem 808 may include a number of memories including a main random access memory (RAM) 818 for storage of instructions and data during program execution and a read only memory (ROM) 820 in which fixed instructions are stored. File storage subsystem 810 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Bus subsystem 804 provides a mechanism for letting the various components and subsystems of data processing system 802 communicate with each other as intended. Although bus subsystem 804 is shown schematically as a single bus, alternative embodiments of the bus subsystem may utilize multiple busses.

Data processing system 800 can be of varying types including a personal computer, a portable computer, a workstation, a network computer, a mainframe, a kiosk, or any other data processing system. Due to the ever-changing nature of computers and networks, the description of data processing system 800 depicted in FIG. 8 is intended only as a specific example for purposes of illustrating the preferred embodiment of the computer system. Many other configurations having more or fewer components than the system depicted in FIG. 8 are possible.

The present invention can be implemented in the form of control logic in software or hardware or a combination of both. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for creating a playlist for media objects, the method comprising:

for a set of media objects each including recorded information, determining a universal identifier (ID) for each media object, the universal ID for each media object being generated by applying an algorithm to at least a portion of the recorded information of the media object, each universal ID being dependent upon the algorithm and at least a portion of the recorded information and independent of information associated with the media object or a provider of the media object, the universal ID for each instance of one of the media objects being identical when generated using the algorithm;

receiving a selection of a set of the universal IDs;

generating a playlist ID based on the set of universal IDs; and creating a fixed representation of the playlist ID, the fixed representation allowing a device to use the playlist ID to determine media objects including recorded information corresponding to the recorded information of one of the media objects used to generate the set of universal IDs, wherein the device is operable to analyze the recorded information for each media object available to the device using the algorithm to determine whether the media object corresponds to the set of universal IDs, independent of whether the media object already has a universal ID or other identifier, and wherein the algorithm is one of a hash algorithm and a fingerprint algorithm for generating a universal ID using at least a portion of the recorded information for one of the media objects.

2. The method of claim 1, wherein the media objects are provided by one or more content providers, wherein different content providers use different source information or digital rights management for media objects.

3. The method of claim 1, wherein the playlist ID comprises a pointer to a list of the set of universal IDs.

4. The method of claim 1, wherein information from the playlist ID is used to determine the set of universal IDs.

5. The method of claim 1, further comprising:
reading the fixed representation of the playlist ID;
determining the set of universal IDs using the playlist ID; and
determining media objects using the set of universal IDs.

6. The method of claim 5, further comprising determining if any of the media objects are locally accessible to a reader that read the fixed representation.

7. The method of claim 6, further comprising if any of the media objects are locally accessible, outputting those media objects locally accessible.

8. The method of claim 6, further comprising if any of the media objects are not locally accessible, generating a request for those media objects that are not locally accessible.

9. The method of claim 8, further comprising sending the request to a service to retrieve the media objects that are not locally accessible.

10. The method of claim 9, further comprising:
receiving the media objects that are not locally accessible; and
outputting the received media objects.

11. The method of claim 1, wherein the device using the playlist ID to determine media objects is different than a second device used to create the playlist ID.

12. The method of claim 1, wherein receiving the set of universal IDs comprises scanning universal IDs in the set of universal IDs.

13. The method of claim 1, wherein the fixed representation comprises a bar code or an RFID.

14. The method of claim 1, wherein a universal ID in the set of universal IDs is generated based on a portion of the recorded information of the first media object, wherein the universal ID and an indication of the portion of the recorded information that was used to generate the ID allows a device to determine if the portion of the recorded information is accessible to a device.

15. A method for creating a playlist ID, the method comprising:
for a set of media objects each including recorded information, determining a universal identifier (ID) for each media object, the universal ID for each media object being generated by applying an algorithm to at least a portion of the recorded information of the media object, each universal ID being dependent upon the algorithm and at least a portion of the recorded information and independent of information associated with the media object or a provider of the media object, the universal ID for each instance of one of the media objects being identical when generated using the algorithm;

receiving a selection of a set of the universal IDs;

generating a playlist ID and associating the set of universal IDs with the playlist ID; and creating a fixed representation of the playlist ID, the fixed representation allowing a device to use the playlist ID to determine media objects including recorded information corresponding to the recorded information of one of the media objects used to generate the set of universal IDs associated with the playlist ID, wherein the device is operable to analyze the recorded information for each media object available to the device using the algorithm to determine whether the media object corresponds to the set of universal IDs, independent of whether the media object already has a universal ID or other identifier.

16. The method of claim 15, further comprising
receiving a selection of one or more additional universal IDs; and
associating the one or more additional universal IDs with the playlist ID, wherein the fixed representation of the playlist ID allows the device to use the playlist ID to determine media objects including the content of media objects used to generate the one or more additional universal IDs associated with the playlist ID.

17. The method of claim 15, wherein the fixed representation of the playlist ID is generated before the set of universal IDs is associated with the playlist ID.

18. A device for creating a playlist for media objects, the device comprising:
a processor; and
memory including instructions that, when executed by the processor, cause the processor to:
determine a universal identifier (ID) for each media object in a set of media objects each including recorded information, the universal ID for each media object being generated by applying an algorithm to at least a portion of the recorded information of the media object, each universal ID being dependent upon the algorithm and at least a portion of the recorded information and independent of information associated with the media object or a provider of the media object, the universal ID for each instance of one of the media objects being identical when generated using the algorithm;
receive a selection of a set of the universal IDs;
generate a playlist ID based on the set of universal IDs; and create a fixed representation of the playlist ID, the fixed representation allowing a device to use the playlist ID to determine media objects including recorded information of media objects used to generate the set of universal IDs, wherein the device is operable to analyze the recorded information for each media object available to the device using the algorithm to determine whether the media object corresponds to the set of universal IDs, independent of whether the media object already has a universal ID or other identifier.

19. The device of claim 18, wherein the media objects are provided by one or more content providers, wherein different content providers use different source information or digital rights management for media objects.

* * * * *